June 26, 1951  J. H. WILLIAMS  2,558,502
INDEX MECHANISM
Filed Nov. 10, 1948

INVENTOR.
JOHN H. WILLIAMS
BY
Robert L Kahn
ATTORNEY

Patented June 26, 1951

2,558,502

UNITED STATES PATENT OFFICE 2,558,502

INDEX MECHANISM

John H. Williams, Barrington, Ill., assignor to Oak Mfg. Co., Chicago, Ill., a corporation of Illinois Application November 10, 1948, Serial No. 59,209

1 Claim. (Cl. 74—527)

This invention relates to an index mechanism and is particularly useful in rotary switches and the like. The invention provides a simple and efficient structure which may be manufactured cheaply and operate satisfactorily.

In order that the invention may be understood, it will be disclosed in connection with the drawing wherein Figure 1 is a side view of an index mechanism embodying the present invention, this view also showing a portion of a switch with which the invention may be used.

Figure 1:
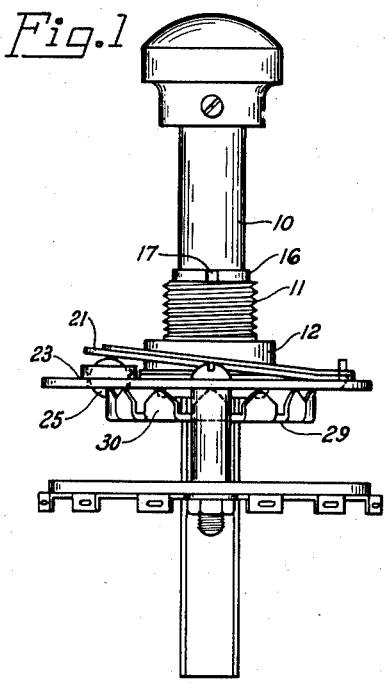
Figure 4:
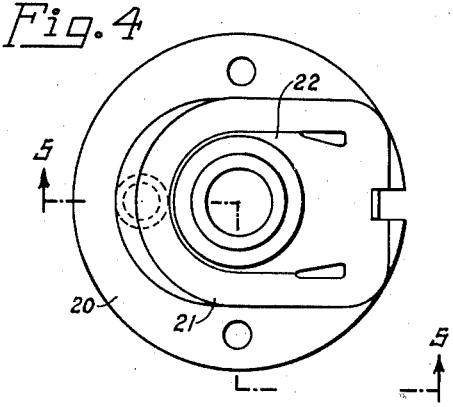
Figure 4 is a detail of one portion of the index mechanism.

Referring now to the drawings, shaft 10 carries thereon bushing 11 having shoulder portion 12 and reduced end portion 13 as shown. The bushing and shaft are both of metal. Bushing 11 is retained against endwise movement on shaft 10 by C washer 16 disposed in suitable slot 17 in shaft 10.

Figure 5:
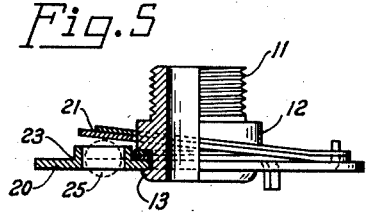
Figure 5 is a section on broken line 5—5 of Figure 4.
Figure 2:
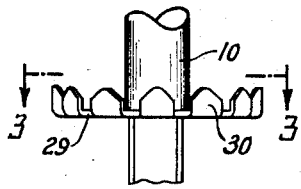
Figure 2 is a detail of one portion of the mechanism.
Figure 6:
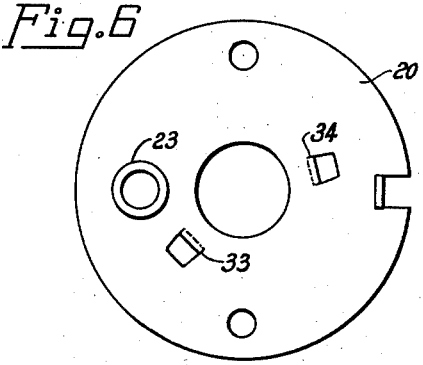
Figures 6 and 7 are plan and side views respectively of a plate part.
Figure 3:
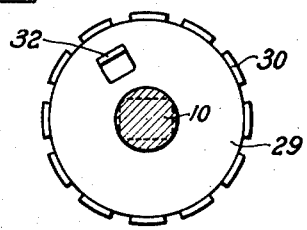
Figure 3 is a sectional view on line 3—3 of Figure 2.
Figure 7:
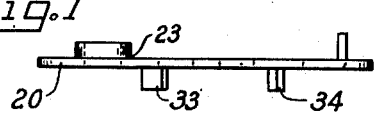

Disposed against shoulder 12 is plate 20 preferably of steel and a member having clip portion 21 cut out therefrom. Clip portion 21 has portion 22 for locking the clip to the bushing. At portion 23 of plate 20 a suitable aperture is provided with the metal shaped to provide a channel and disposed in this channel is ball bearing 25. Clip 21 is of spring metal and bears against ball bearing 25 and urges the same downwardly as seen in Figure 5. Plate 20 and portion 22 are maintained in a position against shoulder 12 by peaning the end of the bushing at 13.

Rigidly secured to shaft 10 is index plate 29 having a plurality of teeth 30 formed around the edge of disc 29 and extending generally parallel to the axis of shaft 10. The teeth of the index plate extend toward plate 20 as shown in Figure 1. The shape of the teeth and spacing between adjacent teeth are properly related to the diameter of ball 25 so that when the parts are assembled as shown in Figure 1, the ball bearing will tend to fall in a space between two adjacent teeth.

It is understood that the index mechanism is mounted upon a suitable support by threading bushing 11 therethrough and clamping the same tightly by means of a locknut not shown, in the usual fashion. Hence it may be assumed that in use, bushing 11 and plate 20 as well as clip 21 and ball bearing will remain stationary. Rotation of shaft 10 will cause serrated disc 29 to turn with respect to the ball bearing.

The index mechanism shown may be used with any suitable switch mechanism such as shown in general form in Figure 1.

In order to define the angular extent of the index range, ear 32 may be struck up from index plate 29. This ear extends toward plate 20. Plate 20 has ears 33 and 34 struck down therefrom. These ears cooperate with ear 32 so that ear 32 will travel only between the two ears.

What is claimed is:

An index mechanism comprising a shaft, a bushing on said shaft, a flat plate rigidly supported on said bushing and having an apertured portion eccentric with respect to said shaft, a ball bearing disposed in said apertured portion, a spring clip carried by said bushing and having a portion overlying the ball bearing and urging the same through said apertured portion in a direction generally parallel to the shaft axis, a toothed member on said shaft, said toothed member having teeth extending toward said ball bearing and the toothed member being rotatable with said shaft, said toothed member being disposed on the side of the plate remote from said spring clip and being so dimensioned that the teeth lie along a circle around the shaft with a tooth or a space between adjacent teeth being disposed underneath said ball bearing and the teeth being sufficiently close to the apertured plate portion so that the ball bearing is retained in position at all times, said bushing and plate and ball bearing being adapted to be stationary and the shaft and toothed member being rotatable whereby said ball bearing is urged by the spring clip into the space between adjacent teeth for index action.

JOHN H. WILLIAMS.

REFERENCES CITED

The following references are of record in the file of this patent:

UNITED STATES PATENTS

| Number | Name | Date |
|---|---|---|
| 1,121,750 | Miller | Dec. 22, 1914 |
| 1,185,467 | Beauchamp | May 30, 1916 |
| 1,715,015 | Soreng | May 28, 1929 |
| 1,740,977 | Freers | Dec. 24, 1929 |
| 2,130,219 | Allison et al. | Sept. 13, 1938 |
| 2,153,430 | Newman | Apr. 4, 1939 |
| 2,292,717 | Rubinstein | Aug. 11, 1942 |